(12) United States Patent
Ozeki et al.

(10) Patent No.: US 7,986,276 B2
(45) Date of Patent: Jul. 26, 2011

(54) ELECTRONIC EQUIPMENT

(75) Inventors: Yoshie Ozeki, Saitama (JP); Hiroyuki Hasebe, Chigasaki (JP); Hideyuki Oozu, Yokohama (JP); Yukinori Akamoto, Imba-gun (JP); Takashi Shimoyamada, Kawasaki (JP); Hideaki Yasui, Yokohama (JP); Kenichi Takahashi, Yokohama (JP); Nobuyasu Negishi, Yokohama (JP); Kiyoshi Senoue, Yokohama (JP); Koichi Kawamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 342 days.

(21) Appl. No.: 12/370,995

(22) Filed: Feb. 13, 2009

(65) Prior Publication Data

US 2009/0208779 A1 Aug. 20, 2009

Related U.S. Application Data

(63) Continuation of application No. PCT/JP2007/065643, filed on Aug. 9, 2007.

(30) Foreign Application Priority Data

Aug. 17, 2006 (JP) ................................ 2006-222653

(51) Int. Cl.
*H01Q 1/24* (2006.01)
(52) U.S. Cl. ...................................................... 343/702

(58) Field of Classification Search .................. 343/702, 343/720, 904; 455/90.1, 90.3, 575.1, 575.3, 455/575.7; 429/12, 13, 34, 38, 39, 40
See application file for complete search history.

(56) References Cited

U.S. PATENT DOCUMENTS

| 7,359,739 B2 * | 4/2008 | Ogura ........................ 455/575.1 |
| 7,427,448 B2 * | 9/2008 | Ito et al. ........................ 429/410 |
| 7,643,855 B2 * | 1/2010 | Iwama et al. .............. 455/575.1 |
| 2006/0263672 A1 * | 11/2006 | Lee et al. ........................ 429/39 |

FOREIGN PATENT DOCUMENTS

| JP | 2000-106201 | 4/2000 |
| JP | 2005-208702 | 8/2005 |
| JP | 2005-531371 | 10/2005 |
| JP | 2006-139328 | 6/2006 |

OTHER PUBLICATIONS

International Search Report for International Application No. PCT/JP2007/065643.
International Preliminary Report on Patentability and Written Opinion issued by the International Bureau of WIPO for International Application No. PCT/JP2007/065643, on Feb. 26, 2009.

* cited by examiner

*Primary Examiner* — Hoang V Nguyen
(74) *Attorney, Agent, or Firm* — Finnegan, Henderson, Farabow, Garrett & Dunner, L.L.P.

(57) ABSTRACT

In electronic equipment using a fuel cell as a power source, an antenna and a fuel cell, which are provided in a lower case of a main body receiving electronic parts, are arranged at a given distance from each other. An acceptable communication state can be established in the electronic equipment.

3 Claims, 2 Drawing Sheets

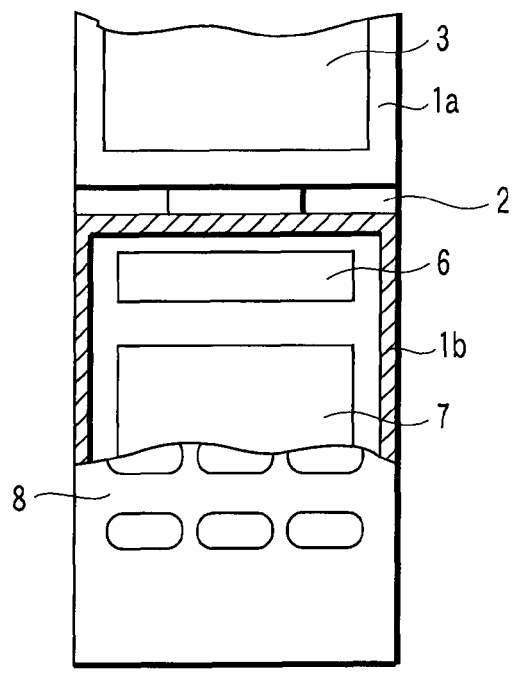
F I G. 2
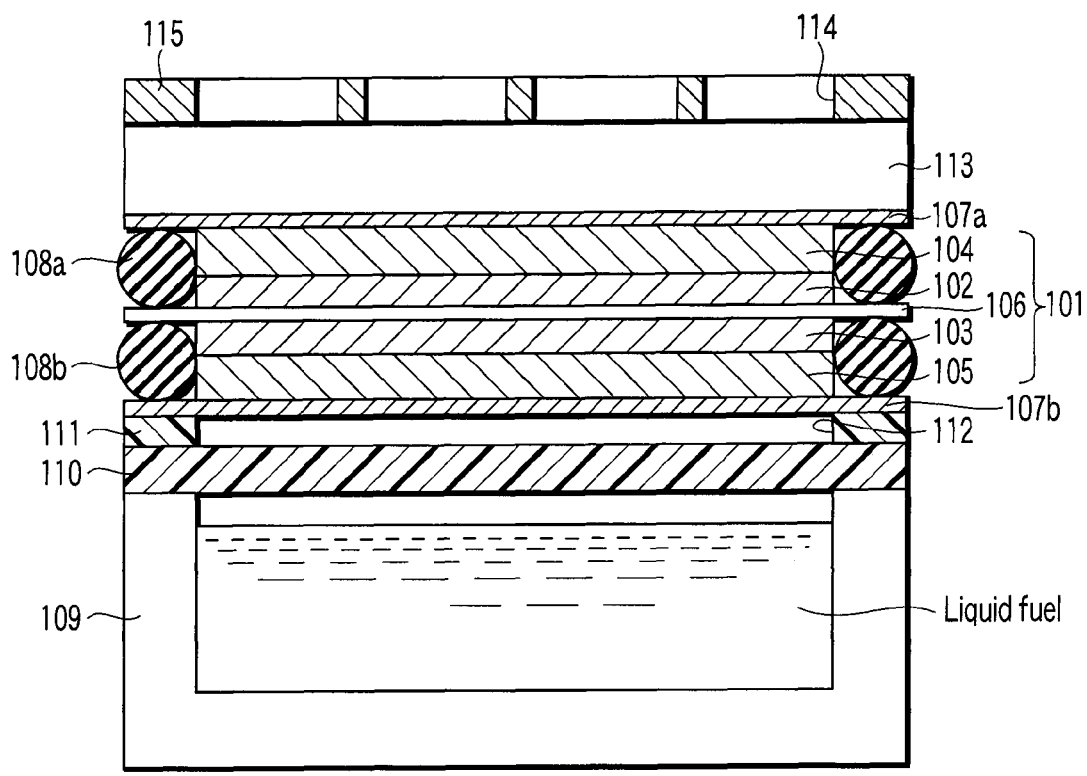
F I G. 3

ELECTRONIC EQUIPMENT

CROSS-REFERENCE TO RELATED APPLICATIONS

This is a Continuation Application of PCT Application No. PCT/JP2007/065643, filed Aug. 9, 2007, which was published under PCT Article 21(2) in Japanese.

This application is based upon and claims the benefit of priority from prior Japanese Patent Application No. 2006-222653, filed Aug. 17, 2006, the entire contents of which are incorporated herein by reference.

BACKGROUND OF THE INVENTION

1. Field of the Invention

The present invention relates to electronic equipment such as a cellular phone which transmits and receives radio waves with high frequencies.

2. Description of the Related Art

Much effort has recently been made to provide electronic equipment such as cellular phone devices with multiple functions and reduced sizes. In connection with the reduction in the size of the electronic equipment, attempts have been made to use fuel cells as a power source. The fuel cell has the advantages of being able to generate power simply by being supplied with a fuel and an oxidizer and thus to continuously generate power simply by refueling. Consequently, fuel cells with successfully reduced sizes are very effective as a power source for the cellular phone device.

Thus, much attention has been paid to direct methanol fuel cells (hereinafter referred to as DMFCs) such as one disclosed in, for example, Jpn. Pat. Appln. KOKAI Publication No. 2000-106201. DMFC includes an anode, a cathode, and an electrolyte membrane located between the anode and the cathode. Each of the anode and the cathode is made up of a power collector and a catalyst layer. A water solution of methanol is supplied, as a fuel, to the anode, which thus generates protons as a result of catalytic reaction. On the other hand, air is supplied to the cathode (air electrode) through an air intake. In the cathode, the protons having passed through the electrolyte membrane react, on the catalyst, with oxygen contained in supplied air, to generate power. As described above, DMFC uses methanol, having a high energy density, as a fuel to extract current directly from the methanol on the electrode catalyst. Furthermore, DMFC need not be modified. Thus, the size of DMFC can be reduced. Furthermore, this fuel can be handled more easily than a hydrogen gas. As a result, DMFC is a promising power source for the cellular phone device.

A good conductor such as a metal material is used, as a component, in many parts of the fuel cell including the power collectors of the anode and cathode. If such a fuel cell is used as a power source for the cellular phone device, the fuel cell may be located close to an antenna owing to a limited space inside the device. However, since the cellular phone device transmits and receives, for example, a radio wave with a high frequency band of 800 MHz to 3 GHz, the closeness, to the antenna, of the good conductors making up the parts of the fuel cell may disturb a radiation pattern of the antenna and increase a feeding point impedance. Thus, communication performance may disadvantageously be significantly degraded.

BRIEF SUMMARY OF THE INVENTION

An object of the present invention is to provide electronic equipment that uses, as a power source, a fuel cell allowing an acceptable communication state to be maintained.

According to an aspect of the present invention, there is provided an electronic equipment comprising a main body receiving electronic parts, an antenna provided in the main body to transmit and receive a radio wave with a high frequency of at least 470 MHz, and a fuel cell provided in the main body as a power source and having a good conductor as a component, wherein the fuel cell is located at a given distance from the antenna so as to enable disturbance of a radiation pattern of the antenna to be avoided.

Furthermore, according to an another aspect of the present invention, in the electronic equipment described above, the distance between the fuel cell and the antenna is at least 5 mm.

Moreover, according to a yet another aspect of the present invention, in the electronic equipment described above, the fuel cell has a cathode catalyst layer, an anode catalyst layer, a proton conductive membrane located between the cathode catalyst layer and the anode catalyst layer, and means for supplying a fuel to the anode catalyst layer.

BRIEF DESCRIPTION OF THE SEVERAL VIEWS OF THE DRAWING

FIG. 2 is a partly cutaway front view schematically showing the cellular phone device shown in FIG. 1; and FIG. 3 is a sectional view schematically showing the internal structure of a fuel cell installed in the cellular phone device shown in FIG. 1.

DETAILED DESCRIPTION OF THE INVENTION

Figure 1:
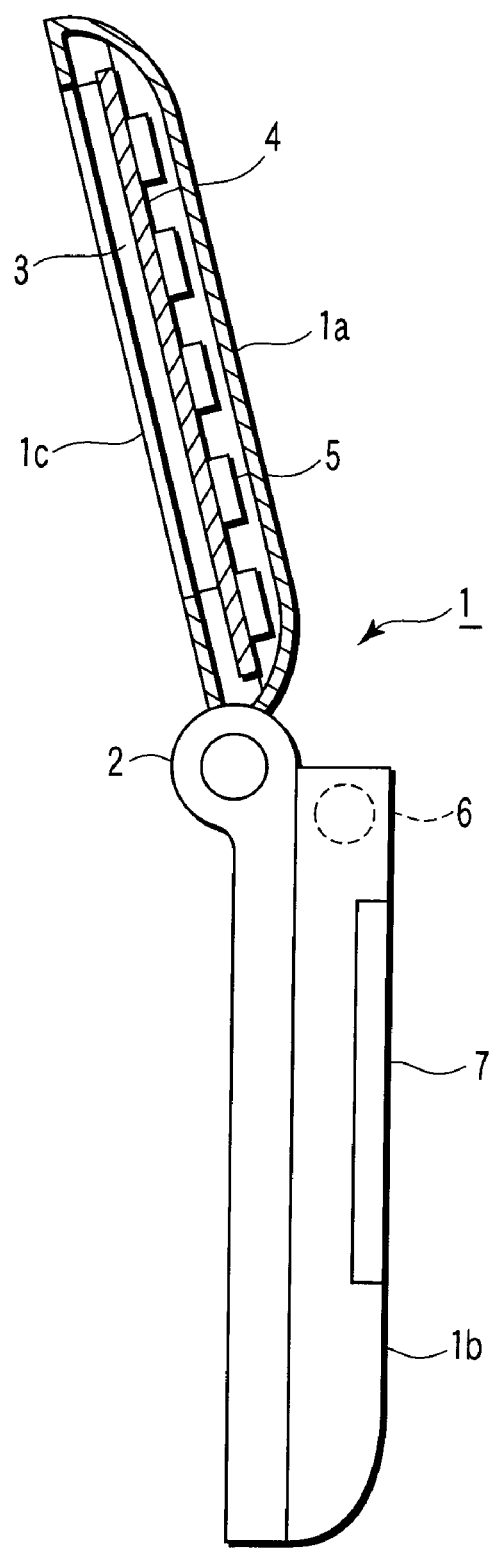
FIG. 1 is a partly cutaway side view schematically showing a cellular phone device according to a first embodiment of the present invention.

Electronic equipment according to embodiments of the present invention will be described below with reference to the drawings.

First Embodiment

FIG. 1 shows a general configuration of a cellular phone device according to a first embodiment of the present invention.

In FIG. 1, reference numeral 1 denotes a main body receiving electronic parts therein. The device main body 1 has an upper case 1a and a lower case 1b formed of a resin material, and a hinge portion 2 coupling the upper case 1a and the lower case 1b together. The electronic equipment can be folded around the hinge portion 2.

A display window portion 1c is provided in a surface of the upper case 1a which corresponds to the lower case 1b when the electronic equipment is folded. A liquid crystal display portion 3 as a display portion is provided in the display window portion 1c. The liquid crystal display portion 3 displays various pieces of information such as telephone numbers and mail texts.

Furthermore, a circuit board 4 is provided inside the upper case 1a. Various electric components 5 are provided on the circuit board 4. The electric components 5 make up various circuits such as a transmission circuit that converts an audio signal into a radio wave with a high frequency for transmission, a reception circuit that receives and converts the radio wave with the high frequency into the audio signal, and a control circuit that controls the transmission circuit and the reception circuit, though the circuits are not shown in the drawings. In this case, the radio wave with the high frequency uses a frequency band of, for example, 800 MHz to 2 GHz.

On the other hand, as shown in FIG. 2, an antenna 6 and a fuel cell 7 serving as a power source portion are arranged inside the lower case 1b.

The antenna 6 transmits the radio wave with the high frequency into which the transmission circuit has converted the audio signal, to a relay station (not shown in the drawings). The antenna 6 also inputs the radio wave with the high frequency from the relay station, to the reception circuit.

The fuel cell 7 is composed of an internal-evaporation DMFC, and has a membrane-electrode assembly (MEA) 101 as shown in FIG. 3. The membrane-electrode assembly (MEA) 101 includes a cathode made up of a cathode catalyst layer 102 and a cathode gas diffusion layer 104, an anode made up of an anode catalyst layer 103 and an anode gas diffusion layer 105, and a proton conductive electrolyte membrane 106 located between the cathode catalyst layer 102 and the anode catalyst layer 103. A catalyst contained in each of the cathode catalyst layer 102 and the anode catalyst layer 103 may be, for example, elementary metal made up of a platinum group element (Pt, Ru, Rh, Ir, Os, Pd, or the like) or an alloy containing the platinum group elements. Desirably, Pt—Ru, which is highly resistant to methanol or carbon monoxide, is used as the anode catalyst, and platinum is used as the cathode catalyst. However, the present invention is not limited to this aspect. Furthermore, a supported catalyst using a conductive carrier such as a carbon material or a support-less catalyst may be used. Additionally, a proton conductive material making up the proton conductive electrolyte membrane 106 may be, for example, a fluorine-containing resin with a sulfonic acid group (for example, a perfluoro sulfonic acid polymer), a hydrocarbon-containing resin with a sulphonic acid group, or an inorganic substance such as a tungstic acid or a phosphotungstic acid. However, the present invention is not limited to these materials.

The cathode catalyst layer 102 is stacked on a cathode gas diffusion layer 104. The anode catalyst layer 103 is stacked on the anode gas diffusion layer 105. The cathode gas diffusion layer 104 serves to uniformly feed an oxidizer to the cathode catalyst layer 102. The cathode gas diffusion layer 104 also serves as a power collector for the cathode catalyst layer 102. A cathode conductive layer 107a and an anode conductive layer 107b are in contact with the cathode gas diffusion layer 104 and the anode gas diffusion layer 105, respectively. Each of the cathode conductive layer 107a and the anode conductive layer 107b may be, for example, a porous layer (for example, a mesh) or a foil which is made up of a metal material such as gold or nickel, or a composite material including a good conductive metal material such as stainless steel (SUS) which is covered with good conductive metal. A cathode seal material 108a like a rectangular frame is positioned between the cathode conductive layer 107a and the proton conductive electrolyte membrane 106. Furthermore, the cathode seal material 108a surrounds the peripheries of the cathode catalyst layer 102 and the cathode gas diffusion layer 104. On the other hand, an anode seal material 108b like a rectangular frame is positioned between the anode conductive layer 107b and the proton conductive electrolyte membrane 106. Furthermore, the anode seal material 108b surrounds the peripheries of the anode catalyst layer 103 and the anode gas diffusion layer 105. The cathode seal material 108a and the anode seal material 108b are O rings that prevent possible leakage of the gas and the oxidizer from the membrane-electrode assembly 101.

A liquid fuel tank 109 is located below the membrane-electrode assembly 101. Liquid methanol or a water solution of methanol is accommodated in the liquid fuel tank 109. A gas-liquid separation membrane is located at an opening end of the liquid fuel tank 109 as a fuel evaporation layer 110 so as to cover the opening end; the gas-liquid separation membrane, for example, allows an evaporated component of the liquid fuel to pass through and does not allow the liquid fuel to pass through. Here, the evaporated component of the liquid fuel means evaporated methanol if liquid methanol is used as a liquid fuel, or a mixed gas of an evaporated component of methanol and an evaporated component of water if a water solution of methanol is used as a liquid fuel. Furthermore, a preferable liquid fuel is a water solution of methanol with a concentration exceeding 50 mol %, or pure methanol. The purity of the pure methanol is desirably set to at least 95 wt % and at most 100 wt %. The liquid fuel need not necessarily be limited to the methanol fuel but may be, for example, an ethanol fuel such as a water solution of ethanol or pure ethanol, a propanol fuel such as a water solution of propanol or pure ethanol, a glycol fuel such as a water solution of glycol or pure glycol, dimethyl ether, a formic acid, or any other liquid fuel. In any case, the liquid fuel corresponding to the fuel cell is accommodated in the liquid fuel tank 109.

A resin frame 111 is stacked between the gas-liquid separation membrane of the fuel evaporation layer 110 and the anode conductive layer 107b. A space enclosed by the frame 111 functions as an evaporated fuel accommodation chamber 112 (what is called a steam pocket) in which the evaporated fuel diffusing through the gas-liquid separation membrane of the fuel evaporation layer 110 is temporarily accommodated. The evaporated fuel accommodation chamber 112 and the gas-liquid separation membrane exert a transmitted methanol amount reducing effect, which makes it possible to avoid feeding a large amount of evaporated fuel to the anode catalyst layer 103 at a time. Consequently, possible methanol crossover can be inhibited. The frame 111 is rectangular and is formed of a thermoplastic polyester resin, for example, polyethylene terephthalate.

On the other hand, a moisture retaining plate 113 is stacked on the cathode conductive layer 107a stacked on the membrane-electrode assembly 101. The moisture retaining plate 113 promotes reaction in which water generated in the cathode catalyst layer 102 migrates to the anode catalyst layer 103 through the proton conductive electrolyte membrane 106. A surface layer 115 is stacked on the moisture retaining plate 113; a plurality of air intakes 114 through which air as an oxidizer is taken in are formed in the surface layer 115. The surface layer 115 also serves to pressurize the stack including the membrane-electrode assembly 101 to enhance the adhesion of stack. Thus, the surface layer 115 is formed of metal, for example, SUS 304. The moisture retaining plate 113 serves to inhibit possible evaporation of the water generated in the cathode catalyst layer 102. The moisture retaining plate 113 also serves as an auxiliary diffusion layer to evenly introduce the oxidizer into the cathode gas diffusion layer 104 to promote even diffusion of the oxidizer into the cathode catalyst layer 102.

As shown in FIG. 2, the fuel cell 7 is located at least a given distance from the antenna 6. That is, when the fuel cell 7 is located closer to the antenna 6 than required, the presence of the good conductor making up the fuel cell 7 may disturb the radiation pattern of the antenna 6 as described above. This may also increase a feeding point impedance to degrade communication performance. Thus, in the present embodiment, the antenna 6 and the fuel cell 7 are arranged at the given distance from each other to eliminate the adverse effect of the presence of the good conductor making up the fuel cell 7. Specifically, the inventors have confirmed that setting the distance between the fuel cell 7 and the antenna 6 to at least 5 mm allows the adverse effect of the good conductor making up the fuel cell 7 to be avoided.

A key input portion 8 is provided on a surface of the lower case 1b which corresponds to the upper case 1a when the device is folded into two. The key input portion 8 is used to input telephone numbers and mail texts.

Thus, according to the cellular telephone device, the antenna 6 and fuel cell 7, which are provided in the lower case 1b, are arranged at least the given distance from each other. Consequently, even if the fuel cell 7 including good conductors in many parts thereof such as the power collectors of the anode and cathode is provided with the antenna 6, the disturbance of the radiation pattern of the antenna 6 can be avoided. Furthermore, the feeding point impedance can be reduced. Therefore, an acceptable communication state can always be established.

In the above-described embodiment, the electronic equipment is described as a cellular phone device. However, the present invention is not limited to the cellular phone device but is applicable to any other electronic equipment provided that the equipment transmits and receives radio waves with high frequencies via an antenna and uses a fuel cell as a power source. Furthermore, in the above-described embodiment, the cellular phone device uses the frequency band of 800 MHz to 2 GHz. However, the present invention is applicable to electronic equipment having an antenna that transmits and receives radio waves with high frequencies of at least 470 MHz. The present invention is not limited to the above-described embodiment. In practice, the above-described embodiment may be varied without departing from the spirit of the present invention.

Moreover, the above-described embodiment includes various levels of inventions of various levels. Various inventions can thus be extracted by appropriately combining a plurality of components together. For example, even if any of the components shown in the embodiment is removed, the configuration from which this component has been removed can be extracted as an invention provided that the extracted invention can solve the problems described in Background Art and exert the effects described in the Disclosure of the Invention.

The present invention is not limited to the as-described embodiment. In practice, the components of the embodiment can be varied without departing from the spirit of the present invention. Furthermore, various inventions can be formed by appropriately combining a plurality of the components disclosed in the above-described embodiment. For example, some of the components shown in the embodiment may be removed. Moreover, components of different embodiments may be appropriately combined.

For example, in the above description, the fuel cell is configured such that the fuel storing portion is provided below the membrane electrode assembly (MEA). However, the fuel may be fed from the fuel accommodating portion to the membrane electrode assembly through a channel connecting the fuel accommodating portion and the membrane electrode assembly together. Furthermore, in the above description, the fuel cell main body is configured as a passive fuel cell by way of example. However, the present invention is applicable to an active fuel cell and to a fuel cell called a semi-passive type that includes a pump or the like located in a part of the fuel cell and used for fuel supply or the like. In the semi-passive fuel cell, the fuel fed from the fuel accommodating portion to the membrane electrode assembly is used for power generating reaction without being subsequently circulatingly returned to the fuel accommodating portion. The semi-passive fuel cell is different from the conventional active scheme in that the former avoids circulating the fuel. The semi-passive fuel cell thus does not hinder miniaturization of the device or the like. The fuel cell is also different from the pure passive scheme used for the conventional internal evaporation type in that the former uses the pump for fuel supply. Thus, the fuel cell is called the semi-passive scheme as described above. In the semi-passive fuel cell, the pump may be replaced with a fuel shutoff valve provided that the fuel is fed from the fuel accommodating portion to the membrane electrode assembly. In this case, the fuel shutoff valve is provided in order to control the feeding of the liquid fuel through the channel.

Additionally, all of the fuel may be supplied to MEA in the form of vapor. However, the present invention is applicable even if part of the fuel supplied to MEA may be in the form of liquid.

The present invention can provide electronic equipment that uses, as a power source, a fuel cell allowing an acceptable communication state to be established.

What is claimed is:

1. Electronic equipment comprising:
   a main body receiving electronic parts;
   an antenna provided at the main body to transmit and receive a radio wave with a high frequency of at least 470 MHz; and
   a fuel cell provided in the main body as a power source and having a component of electrical conductor,
   wherein the fuel cell is located at a given distance from the antenna so as to enable disturbance of a radiation pattern of the antenna to be avoided.

2. The electronic equipment according to claim 1, wherein the distance between the fuel cell and the antenna is at least 5 mm.

3. The electronic equipment according to claim 1, wherein the fuel cell has a cathode catalyst layer, an anode catalyst layer, a proton conductive membrane located between the cathode catalyst layer and the anode catalyst layer, and means for supplying a fuel to the anode catalyst layer.

* * * * *